Figures 1, 2:
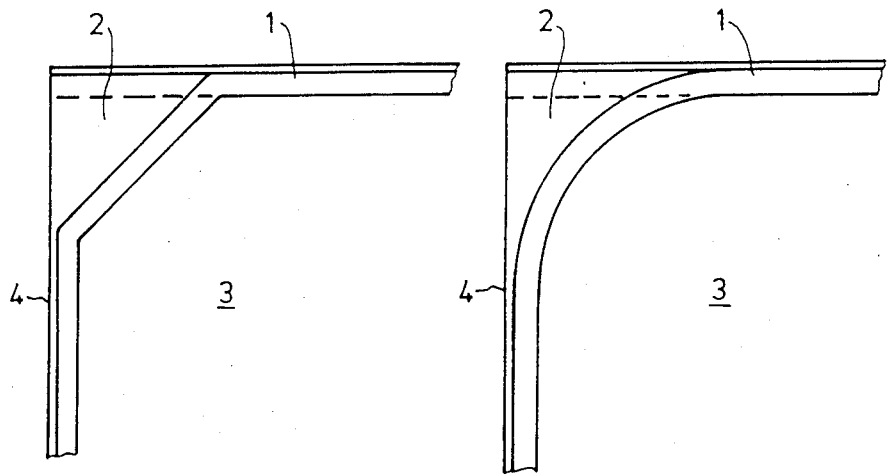

United States Patent [19]

Hinrichsen et al.

[11] Patent Number: 4,766,018
[45] Date of Patent: Aug. 23, 1988

[54] READILY PEELABLE, STERILIZABLE PACKAGES

[75] Inventors: Thomas Hinrichsen, Bomlitz; Holger Preiss, Visselhoevede; Harry Witte, Bomlitz, all of Fed. Rep. of Germany

[73] Assignee: Wolff Walsrode AG, Walsrode, Fed. Rep. of Germany

[21] Appl. No.: 942,143

[22] Filed: Dec. 16, 1986

[30] Foreign Application Priority Data

Dec. 21, 1985 [DE] Fed. Rep. of Germany ....... 3545768

[51] Int. Cl.⁴ ............................................. B32B 27/08
[52] U.S. Cl. ......................................... 428/35; 428/40; 428/344; 428/349; 428/476.9; 428/483; 428/507; 428/515
[58] Field of Search ................... 428/35, 352, 347, 349, 428/202, 515, 516, 40, 461, 476.9, 483, 507

[56] References Cited

U.S. PATENT DOCUMENTS

| | | | |
|---|---|---|---|
| 3,879,492 | 4/1975 | Bontinick | 525/179 |
| 3,926,311 | 12/1975 | Laske | 428/202 |
| 4,125,662 | 11/1978 | Weiner et al. | 428/214 |
| 4,269,321 | 5/1981 | Ichinose et al. | 428/202 |
| 4,521,467 | 6/1985 | Berger | 428/35 |
| 4,652,489 | 3/1987 | Crass et al. | 428/349 |

Primary Examiner—John E. Kittle
Assistant Examiner—Beth A. Bozzelli
Attorney, Agent, or Firm—Sprung Horn Kramer & Woods

[57] ABSTRACT

Readily peelable and sterilizable packages composed of two multi-layer sheets which are attached to one another by sealing in the zone regions and in which one sealing layer comprises an ethylene/1-butene copolymer and the other polypropylene or a propylene/ethylene copolymer.

3 Claims, 1 Drawing Sheet

READILY PEELABLE, STERILIZABLE PACKAGES

The present invention relates to packages which are easy to open (peelable) and sterilizable and are composed of two multi-layer sheets, a so-called upper sheet and lower sheet, which are joined to one another by sealing in the edge zones.

Sterilizable packages composed of multi-layer sheeting are known. Containers of this type are, however, produced by employing multi-layer sheets which at least have identical sealing layers, preferably sealing layers composed of an ethylene/1-butene copolymer. Since it is only possible to open such packages with a considerable expenditure of energy, attempts have already been made also to produce packages which are sterilizable and can be opened more easily (DE-A-2,255,026). When opening the packages, however, it is necessary to tear off and out, completely, part of the sealing layer in the region of the sealed seam of the base layer, which still requires a considerable expenditure of energy and is preferably only possible with a specially shaped tear-off tab.

There was, therefore, a need to provide sterilizable packaging containers which not only withstand the necessary moist sterilization at 121° C. in a back-pressure autoclave without loss of impermeability, but also can be opened more easily when the sterilized contents are subsequently removed.

The invention relates, therefore, to a readily peelable and sterilizable package composed of at least two multi-layer sheets which are attached to one another by sealing in the edge zones each multi-layer sheet comprising at least one sealing layer and in which one sealing layer which effects the joint of the multi-layer sheets comprises essentially an ethylene/1-butene copolymer and the other sealing layer comprises essentially a polypropylene or a proplylene/ethylene copolymer.

The packages according to the invention, preferably packaging containers, are preferably produced in the form of a cup or a tray by the known deep-drawing process, the so-called lower sheet being employed for this purpose, and the cup and the tray being closed by means of a lid made from the so-called upper sheet.

The removable upper sheet preferably has a tear-off tab of any desired shape.

If the package is to be gas tight, both the so-called upper sheet and the lower sheet must contain a gas-proof layer. Any known materials having a low permeability to oxygen, preferably ethylene/vinyl acetate copolymers which have been over 90% saponified, or mixtures of such copolymers with polyamides, or polyvinylidene chloride or aluminum, are suitable for the production of gas-proof layers. If the gas tight packages are to have adequate transparency, it is preferable to use, for the production of the gas-proof layer, a mixture of an ethylene/vinyl acetate copolymer which has been over 90% saponified and a polyamide in a mixing ratio of 35:65–65:35 (% by weight).

The base sheet to which the sealing layer is applied can be identical in the upper sheet and the lower sheet. Thus any thermoplastic material which still has adequate strength at the sterilization temperature is suitable for the production of the base layer. It is preferable to use, for the production of the base layer, partly crystalline polyamides, particularly preferably PA-6, PA-6,6 and PA-6,12, polyesters, polyolefines, particularly preferably propylenepolymers, cellulose film or aluminium. Cellulose film and aluminium are preferred to one embodiment for the upper sheet.

Ethylene/1-butene copolymers having an ethylene content of 70 to 95% by weight, preferably 80–85% by weight, a density of 0.920 to 0.938 g/cm$^3$, preferably 0.932 to 0.936, a melt index of 0.5/10 minutes (190° C.; 2.16 kp) and a melting range from 115° to 135° C. are used for the production of the sealing layers of one of the multi-layer sheets used. The layer thickness is within the range from 25–100 μm, preferably 50–80 μm.

In order to produce the readily peelable package, the multi-layer sheet in which the sealing layer consists essentially of the ethylene/1 butene copolymer mentioned must be combined with a multi-layer sheet in which the sealing layer consists essentially of an ethylene/propylene copolymer or a grade of polypropylene.

Any known propylene/ethylene copolymer which is already used for the production of sealing layers can be employed; preferably a copolymer having an ethylene content of not more than 6% by weight, preferably 4 to 6% by weight, a density of 0.9 to 0.905 g/cm$^3$ and a melt index of 5 to 6 g/10 minutes (230° C.; 2.16 g). The layer thickness should be within the range from 25–100 μm, preferably 80 μm.

The known grades of polypropylene which are already used for the production of sealing layers can be used as the sealing material. They should have density of 0.905 to 0.910 g/cm$^3$, a melt index of 1.5 to 8.0 g/10 minutes (230° C.; 2.16 kp), preferably 2 to 4 g/10 minutes and a melting range of 160° to 165° C. The thickness of the sealing layer should be within the range from 40 to 2000 μm, preferably 100 to 1000 μm.

The packages according to the invention are particularly preferably built up from a combination of the following multi-layer sheets:

1. PA-6 as the base layer, saponified ethylene/vinyl acetate copolymer as the gas-proof layer or a mixture of this copolymer with PA-6,12, if appropriate an intermediate layer of PA-6 and an ethylne/1-butene (=E/B) copolymer as the sealing layer, and
2. PA-6 as the base layer, saponified ethylene/vinyl acetate copolymer (EVOH) or a mixture of this copolymer with PA-6,12, if appropriate an intermediate layer of PA-6, and a grade of polypropylene (=PP) or an ethylene/propylene copolymer (=E/P) as the sealing layer, or a combination of:
1. PA-6 as the base layer and an ethylene/propylene copolymer or polypropylene as a sealing layer, and
2. PA-6 as the base layer and an ethylene/1-butene copolymer as the sealing layer.

If appropriate, known, customary adhesion-promoting layers can also be applied between the individual layers of the multi-layer sheets used.

The packages according to the invention can be shaped, filled and closed on known deep-drawing automatic machines. In so doing, the lower sheet, wound on a roller, is taken over in a clamp chain and is transported by means of the latter through the individual stations of the packaging machine. First, cups or trays are deep-drawn by the application of heat from the flat sheet web by negative or positive shaping. Depending on their size and shape, several trays can be deep-drawn alongside and behind one another in a single operation. The filling of the shaped cups or trays is effected by means of suitable automatic filling machines.

The upper sheet, also wound onto a roller, is then transported similarly to the filled trays and, after evacuation and, if necessary, blanketing with a protective gas, the filled containers are joined to the lower sheeting by means of a permanently heated sealing tool. The packaging containers, which are still connected in a band, are then separated by suitable separating devices, preferably punches.

After being packaged, the filled packages are sterilized in a back-pressure autoclave at not more than 121° C. for 2 hours in order to preserve the contents of the packages.

In spite of the adequate strength of the sealing seam which the packages according to the invention have, even after being sterilized, the packages can be opened in a problem-free manner without a major effort, preferably using a customary tear-off tab corresponding to the dimensions of the package.

FIG. 1 and FIG. 2 show a top view of such possible tear-off tabs. The sealing seam (1) which joins the upper sheet (3) to the lower sheet (4) can be seen in these figures, and also the tear-off tab (2) by means of which the lid (3)=upper sheet (3) can be removed easily from the tray or cup (4)=lower sheet (4).

EXAMPLE 1

Packaging containers are shaped on a deep-drawing machine from a lower sheet of the following composition, starting with the base layer and proceeding to the sealing layer:

PA-6 35 $\mu$m (A)/EVOH-PA-6, 12 mixture 20 $\mu$m (B)/PA-6 35 $\mu$m (C)/PP 600 $\mu$m (D), and from a top sheet having the following composition, starting with the base layer and proceeding to the sealing layer:

PA-6 35 $\mu$m (A')/EVOH-PA-6, 12 mixture 20 $\mu$m (B')/PA-6 35 $\mu$m (C')/E/B/ copolymer 75 $\mu$m (D'), and are filled with a ready-cooked meal, partially evacuated and sealed. The seam strength of the finished packages, measured as specified in DIN 53 455 was found to be approx. 23 N/15 mm.

Figure 3:
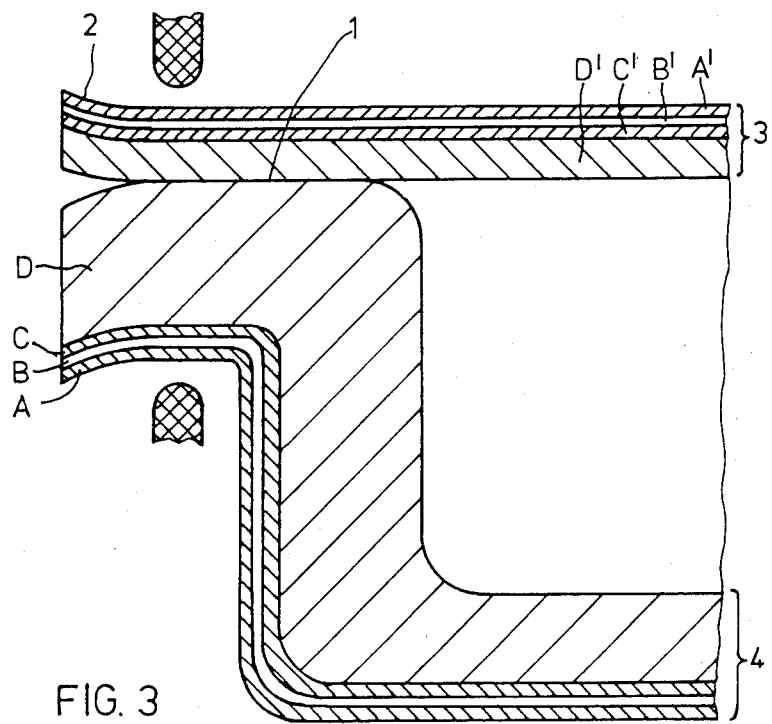

FIG. 3 shows a cross-section of this packaging container according to the invention, in which the composition of the lower sheet (4) and the upper sheet (3) can be deduced from the above data. In the region of the sealing seam (1) the lower sheet (4) is joined all over to the upper sheet (3), it being possible to separate the upper sheet (3) from the lower sheet (4) easily by means of the tear-off tab (2).

These containers are then sterilized in an autoclave under the following conditions: 121° C., 30 minutes and 2 bar back-pressure. After this treatment the seam strength is approx. 13 N/15 mm. The containers are impermeable and thus afford an optimum layer of the contents, in spite of the easy peelability of the lid sheet.

EXAMPLE 2

Packaging containers were shaped on a deep-drawing machine from a lower sheet having the composition PA-6 50 $\mu$m/E/B copolymer 75 $\mu$m, were filled with an infusion solution in a PVC bag and were completely evacuated and sealed to an upper sheet of composition PA-6 30 $\mu$m/E/P-copolymer 75 $\mu$m. The seam strength of the sealed seams is approx. 6 N/15 mm, and this has fallen to approx. 4N/15 mm after sterilization at 115° C. for 30 minutes at 1.5 bar back-pressure. Its value is, however, sufficient to ensure a completely impervious package, since this package is evacuated. Problem-free removal of the contents of the package, for example in an operating theatre, is ensured by the gentle peel strength.

We claim:

1. A readily peelable and sterilizable package composed of a deep-drawn tray and a lid joined to one another along their edges, each of said tray and said lid comprising a core and at least one sealing layer, the sealing layer of one of the tray and the lid comprising essentially an ethylene/1-butene copolymer and the sealing layer of the other of the tray and the lid comprising essentially a polypropylene or a propylene/ethylene copolymer, the difference between the sealing layers permitting them to be separated so as to separate the lid from the tray.

2. A package according to claim 1, in which the lid is provided with a tear-off tab.

3. A package according to claim 1, in which the core of said tray and of said lid is formed of a partly crystalline polyamide, a polyester, a propylene polymer, a cellulose film or aluminum.

* * * * *